US010906157B2

(12) United States Patent
Olberg et al.

(10) Patent No.: US 10,906,157 B2
(45) Date of Patent: Feb. 2, 2021

(54) MODULAR TOOLING FIXTURE WITH INTERCHANGEABLE PANEL DEFINING A TOOLING SURFACE

(71) Applicant: The Boeing Company, Chicago, IL (US)

(72) Inventors: Jeffrey H. Olberg, Federal Way, WA (US); Daniel J. Perron, Federal Way, WA (US); Shane E. Arthur, Kirkland, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 15/437,188

(22) Filed: Feb. 20, 2017

(65) Prior Publication Data
US 2018/0236638 A1 Aug. 23, 2018

(51) Int. Cl.
*B25B 11/00* (2006.01)
*B29C 70/54* (2006.01)
(Continued)

(52) U.S. Cl.
CPC .............. *B25B 11/005* (2013.01); *B25H 1/00* (2013.01); *B29C 70/54* (2013.01); *B23Q 1/032* (2013.01); *B23Q 1/035* (2013.01)

(58) Field of Classification Search
CPC ........ B23Q 1/032; B23Q 1/035; B23Q 1/037; B23Q 3/103; B23Q 3/06; B23Q 3/086; B25B 11/005
(Continued)

(56) References Cited

U.S. PATENT DOCUMENTS 2,378,043 A * 6/1945 Sorensen .................. B64F 5/10
29/464
2,729,040 A * 1/1956 Wallace ................. B23Q 1/032
451/388
(Continued)

FOREIGN PATENT DOCUMENTS

CN 201913633 U 9/2002
CN 1993208 A 7/2007
(Continued)

OTHER PUBLICATIONS

NL, Search Report and Written Opinion; Netherlands Patent Application No. NL2018636, 9 pages (dated Jan. 8, 2018).
(Continued)

*Primary Examiner* — Lee D Wilson
*Assistant Examiner* — Seahee Hong

(57) ABSTRACT

A tooling assembly is provided, for use with a panel defining a tool-side surface and the tool-side surface defining a profile. The tooling assembly includes a base, a plurality of support members fixedly attached to the base, a plurality of frames, and a securing system. The frames each define an upper surface, where each support member is releasably coupled to a corresponding frame by a fastening system. The upper surfaces of the frames are each shaped to correspond with a portion of the profile of the tool-side surface of the panel. The securing system is for providing a suction force configured to releasably secure the panel against the upper surface of the frames.

20 Claims, 9 Drawing Sheets

(51) Int. Cl.
*B25H 1/00* (2006.01)
*B23Q 1/03* (2006.01)

(58) Field of Classification Search
USPC .......................................... 269/21, 266, 296
See application file for complete search history.

(56) References Cited

U.S. PATENT DOCUMENTS

| | | | | |
|---|---|---|---|---|
| 4,336,765 A | * | 6/1982 | Coughlin | B01J 3/006 |
| | | | | 118/50 |
| 4,527,783 A | * | 7/1985 | Collora | B23Q 1/032 |
| | | | | 269/21 |
| 4,705,438 A | * | 11/1987 | Zimmerman | B23Q 1/525 |
| | | | | 409/132 |
| 4,861,008 A | | 8/1989 | Steele et al. | |
| 4,894,903 A | * | 1/1990 | Woods | B25B 11/00 |
| | | | | 269/131 |
| 5,033,178 A | * | 7/1991 | Woods | B64F 5/10 |
| | | | | 29/281.1 |
| 5,249,785 A | * | 10/1993 | Nelson | B25B 11/005 |
| | | | | 269/21 |
| 5,851,563 A | | 12/1998 | Hoffman | |
| 6,121,781 A | * | 9/2000 | Martinez | B21J 15/10 |
| | | | | 324/658 |
| 6,168,358 B1 | | 1/2001 | Engwall et al. | |
| 6,386,805 B1 | * | 5/2002 | Suzuki | B23Q 1/035 |
| | | | | 269/21 |
| 6,598,866 B2 | * | 7/2003 | Helm | B23Q 1/032 |
| | | | | 269/21 |
| 6,764,434 B1 | * | 7/2004 | Volk | B23Q 1/032 |
| | | | | 144/48.1 |
| 8,057,206 B1 | | 11/2011 | McKnight | |
| 8,146,242 B2 | | 4/2012 | Prichard et al. | |
| 8,469,345 B2 | | 6/2013 | Samac et al. | |
| 8,945,455 B2 | | 2/2015 | Everhart et al. | |
| 9,409,361 B2 | | 8/2016 | Sana et al. | |
| 10,035,230 B2 | * | 7/2018 | Buckus | B23Q 3/065 |
| 2001/0020762 A1 | * | 9/2001 | Helm | B25B 11/005 |
| | | | | 269/21 |
| 2006/0261533 A1 | * | 11/2006 | Freeland | B23Q 3/103 |
| | | | | 269/266 |
| 2009/0140482 A1 | * | 6/2009 | Saberton | B23Q 1/035 |
| | | | | 269/296 |
| 2012/0256076 A1 | | 10/2012 | Grankall et al. | |
| 2012/0279812 A1 | | 11/2012 | Peters et al. | |

FOREIGN PATENT DOCUMENTS

| | | |
|---|---|---|
| EP | 1235665 A1 | 9/2002 |
| ES | 2026410 A6 | 4/1992 |
| WO | 01/30540 | 5/2001 |

OTHER PUBLICATIONS

CN, Search Report and Written Opinion, pp. 1-8 (dated Jan. 19, 2020).

* cited by examiner

MODULAR TOOLING FIXTURE WITH INTERCHANGEABLE PANEL DEFINING A TOOLING SURFACE

FIELD

Embodiments of the subject matter described herein relate generally to a tooling fixture, and in particular to a tooling fixture including a plurality of frames releasably coupled to a base of the tooling fixture and a panel releasably coupled to the frames.

BACKGROUND

Various parts such as, for example, aircraft panels may be manufactured using tooling. Conventional tooling usually includes a tooling support or frame and a panel that defines a tooling surface, where the panel is integral with the support. Tooling may be used to fabricate a wide variety of parts. For example, a composite structure may be fabricated by placing composite material along the tooling surface, and then applying vacuum to hold the composite material during curing.

Although conventional tooling is widely used to fabricate a variety of parts, several challenges currently exist. For example, conventional tools are typically heavy and bulky. Thus, substantial capital equipment is required to move the tooling within a facility. Furthermore, since tools are usually bulky, they generally occupy a large amount of space within the facility. Since conventional tools are typically capable of only being able to fabricate a single part, multiple tools often accumulate within a storage area of the facility. This may pose an issue, especially if the facility only has limited storage space. Finally, many conventional tools can be difficult and expensive to repair or modify. In particular, if a component undergoes a design change where the contour or shape of the component is altered, then the tooling may need to undergo substantial rework in order to accommodate the design changes.

SUMMARY

In one embodiment, a tooling assembly is provided, for use with a panel defining a tool-side surface and the tool-side surface defining a profile. The tooling assembly includes a base, a plurality of support members fixedly attached to the base, a plurality of frames, and a securing system. The frames each define an upper surface, where each support member is releasably coupled to a corresponding frame by a fastening system. The upper surfaces of the frames are each shaped to correspond with a portion of the profile of the tool-side surface of the panel. The securing system is for providing a suction force configured to releasably secure the panel against the upper surface of the frames.

In another embodiment, tooling assembly is provided, for use with a panel defining a tool-side surface and the tool-side surface defining a profile. The tooling assembly includes a base, a plurality of support members fixedly attached to the base, a plurality of frames, a securing system, and a rotational assembly. The frames each define an upper surface, where each support member is releasably coupled to a corresponding frame by a fastening system. The upper surfaces of the frames are each shaped to correspond with a portion of the profile of the tool-side surface of the panel. The securing system is for providing a suction force configured to releasably secure the panel against the upper surface of the frames. The rotational assembly includes a shaft, where the shaft is rotatably connected to the base.

In yet another embodiment, a method for supporting a panel by a tooling assembly is disclosed. The method comprises fixedly attaching a plurality of support members to a base. The method further includes releasably coupling each of the support members to a corresponding one of a plurality of frames by a fastening system, where the frames each define a corresponding upper surface. The method also includes releasably coupling the panel to the frames by providing a suction force by a securing system.

Other objects and advantages of the disclosed method and system will be apparent from the following description, the accompanying drawings and the appended claims.

DETAILED DESCRIPTION

The tooling fixture or assembly described herein is relatively quickly reconfigured to support panels having different contours. More specifically, the tooling assembly can be used with a plurality of sets of frames, where each set of frames corresponds to a particular contour of a panel. By changing the set of frames coupled to the tooling assembly, the tooling assembly can be reconfigured for different panels. For example, when a new part is to be worked on, the current set of frames is removed from the tooling assembly, and a new set of frames is coupled to supports of the tooling assembly. The frames can slide along the supports to adjust the position of each frame to define the predetermined contour corresponding to the part. Also, a different number of frames can be used depending on the part. For example, frames can be added to provide additional strength for supporting the part. For shorter parts, frames can be removed and/or positioned closer together.

Figure 1:
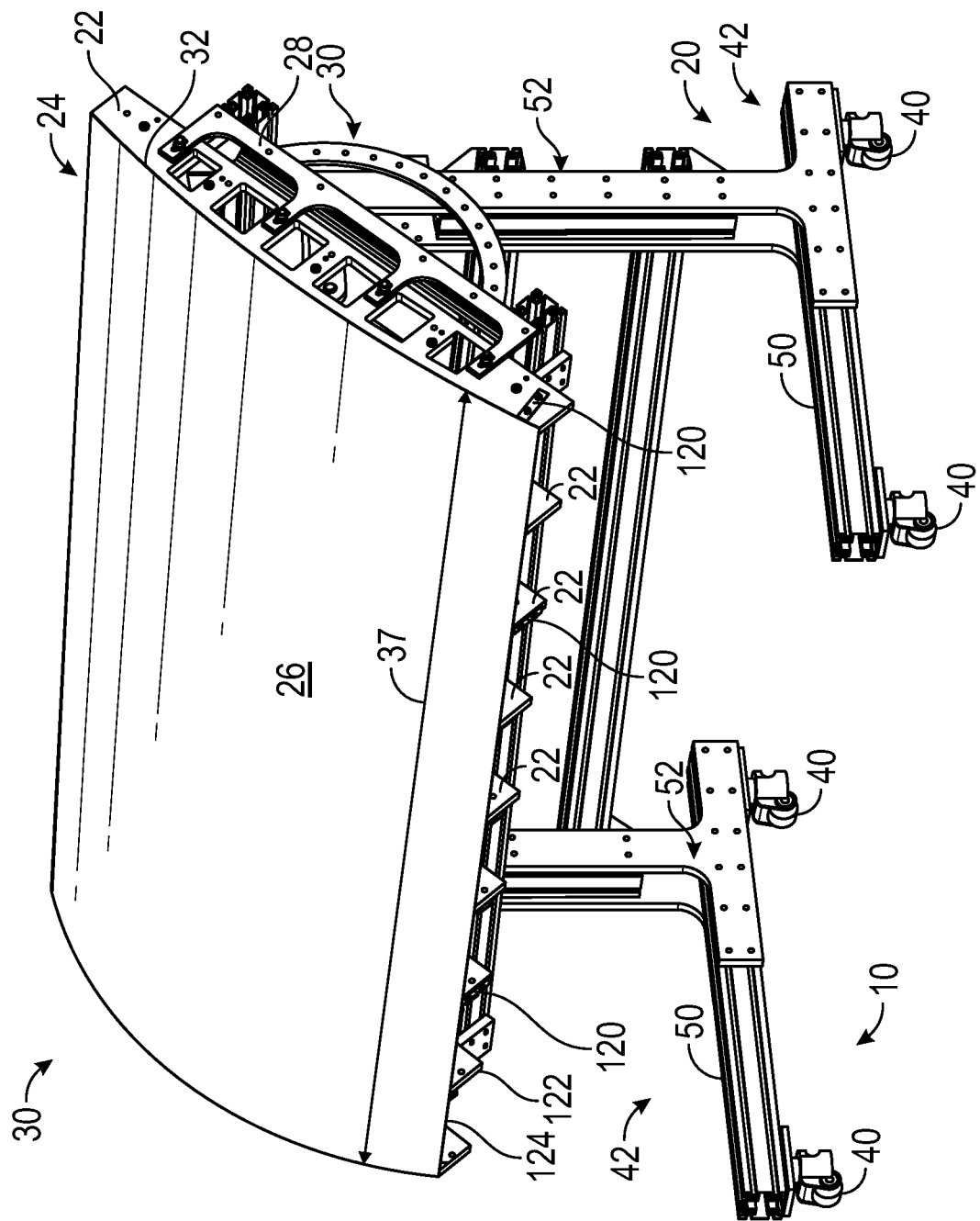
FIG. 1 is a perspective view of the disclosed modular tooling assembly, where the modular tooling assembly includes a base, a plurality of frames, and a panel.

Referring now to FIG. 1, an exemplary modular tooling fixture or assembly 10 is illustrated. The tooling assembly 10 includes a base 20, a plurality of frames 22 (seen in FIG. 2), and a plurality of support members 28. The tooling assembly 10 can be used with a coupon or panel 24. The panel 24 defines a tooling surface 26 for creating a pattern or mold. As explained in greater detail below, the frames 22 are each releasably coupled to one of the support members 28 of the tooling assembly 10, and the panel 24 is releasably coupled to the frames 22. In the exemplary embodiment as shown, the tooling surface 26 of the panel 24 includes a contour or profile that is arcuate or curved when viewed along one of the sides 30 of the panel 24. However, the profile of the tooling surface 26 varies in order to accommodate a particular application.

Figure 2:
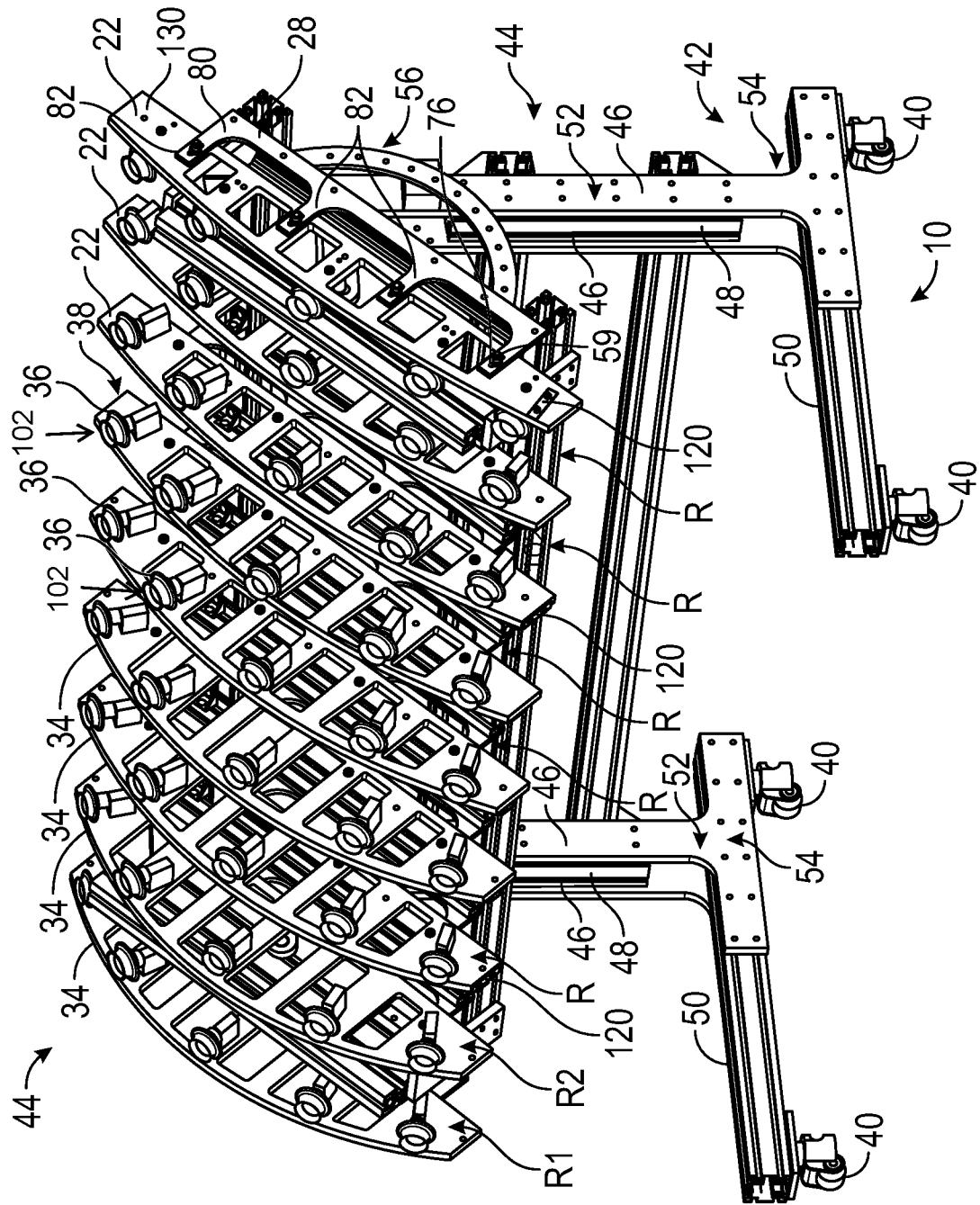
FIG. 2 is an illustration of the tooling assembly shown in FIG. 1, where the panel is removed in order to reveal a plurality of vacuum cups for securing the panel to the frames.

Turning now to FIG. 2, the panel 24 has been removed in order to reveal the plurality of frames 22 as well as a securing system 38, which is illustrated as plurality of vacuum cups 36. The securing system 38 is configured to provide a suction force that releasably secures the panel 24 against the upper surface 34 of the frames 22. Although FIG. 2 illustrates a total of nine frames 22, this embodiment is merely exemplary in nature. In one embodiment, the number of frames 22 depends upon a length 37 of the panel 24 (FIG. 1). For example, additional frames 22 may be included in order to provide additional support and strength if the length 37 of the panel 24 is increased. Similarly, fewer frames 22 may be required in another approach if the length 37 of the panel 24 is shortened.

Referring to both FIGS. 1 and 2, the frames 22 each define a corresponding upper surface 34. The panel 24 defines a tool-side surface 32. The tool-side surface 32 defines a profile that may correspond to the profile of the tooling surface 26 of the panel 24. The upper surfaces 34 of the frames 22 are each shaped to correspond with a portion of the profile defined by tool-side surface 32 of the panel 24. In the embodiment as shown in FIG. 1, the tool-side surface 32 of the panel 24 includes a curved profile. However, this profile is merely exemplary in nature. In another embodiment, the tool-side surface 32 of the panel 24 may include a planar or flat profile as well. The tool-side surface 32 abuts or is seated against the upper surface 34 of each frame 22. The vacuum cups 36 of the securing system 38 provide a suction force configured to releasably couple the panel 24 against the upper surface 34 of the frames 22. The amount of suction applied by the vacuum cups 36 is based at least in part on a thickness of the panel 24, and is explained in detail below. Furthermore, although vacuum cups 36 are illustrated in FIG. 2, the securing system 38 may include any other vacuum device capable of providing the suction necessary to releasably couple the panel 24 to the frames 22. For example, in an alternative embodiment illustrated in FIG. 6 and described in detail below, the securing system 38 includes a plurality of manifolds 200.

Figure 3:
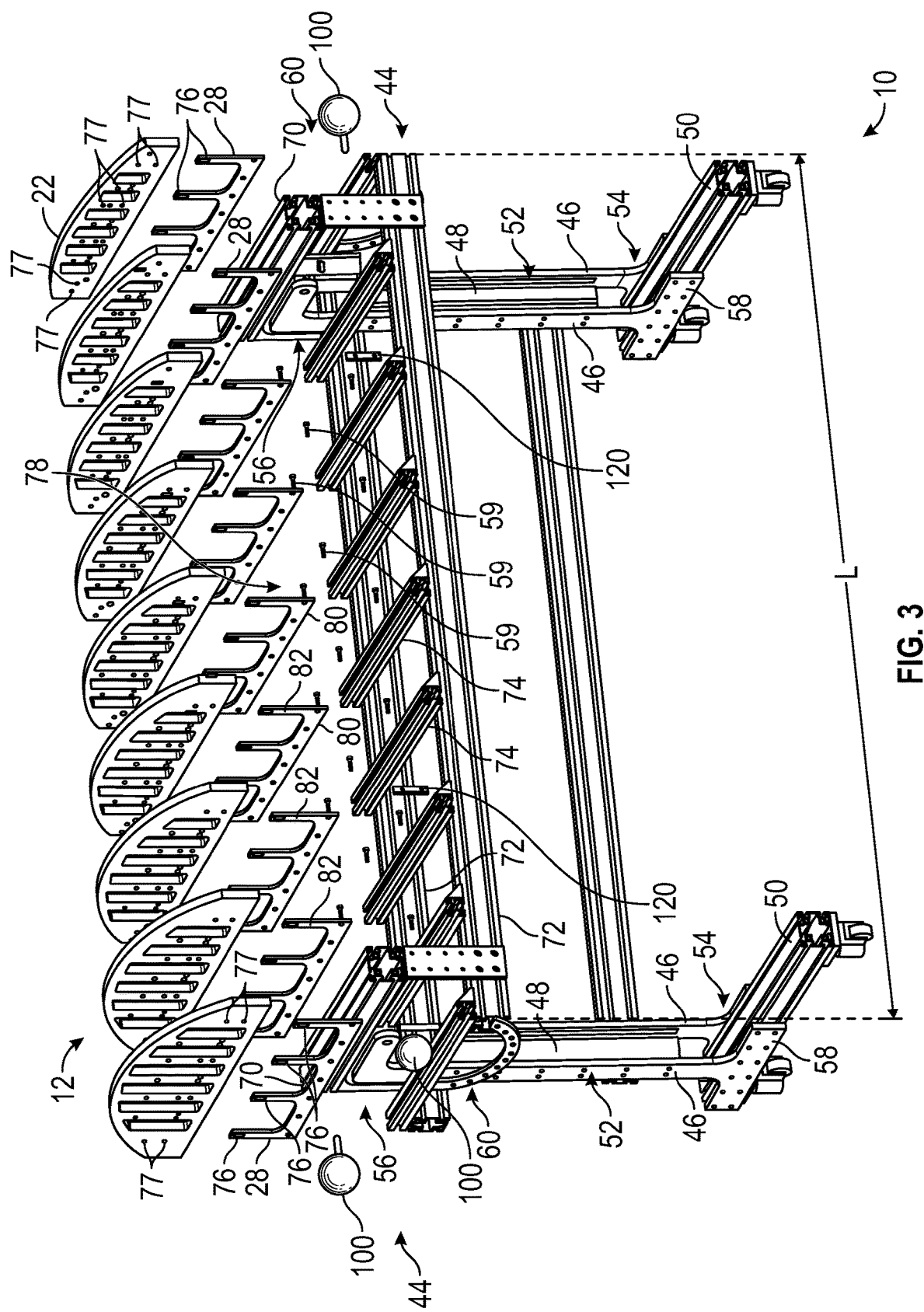
FIG. 3 is an exploded view of the tooling assembly shown in FIG. 1.

Turning back to both FIGS. 1 and 2, the base 20 of the tooling assembly 10 may be supported by a plurality of casters or wheels 40. The wheels 40 may be attached to a bottom portion 42 of the base 20. The wheels 40 support a pair of bars 50 of the base 20. The bars 50 may be disposed at opposite sides 44 of the tooling assembly 10. In the embodiment as shown, the bars 50 are both oriented substantially parallel to one another. Turning now to FIG. 3, which is an exploded view of the tooling assembly 10, the bars 50 may each support a corresponding leg 52 of the tooling assembly 10. Specifically, each leg 52 may be comprised of two panels 46 and a support 48. The two panels 46 may be attached to the support 48, where the panels 46 generally oppose one another.

Each leg 52 may also define a first end portion 54 and a second end portion 56. The first end portion 54 of the leg 52 may define an elongated portion 58. The elongated portion 58 of each leg 52 may extend in a direction that is substantially transverse to the leg 52, and secured to a corresponding one of the side bars 50. The second end portion 56 of the leg 52 may be connected to one of two rotational assemblies 60.

Figure 4:
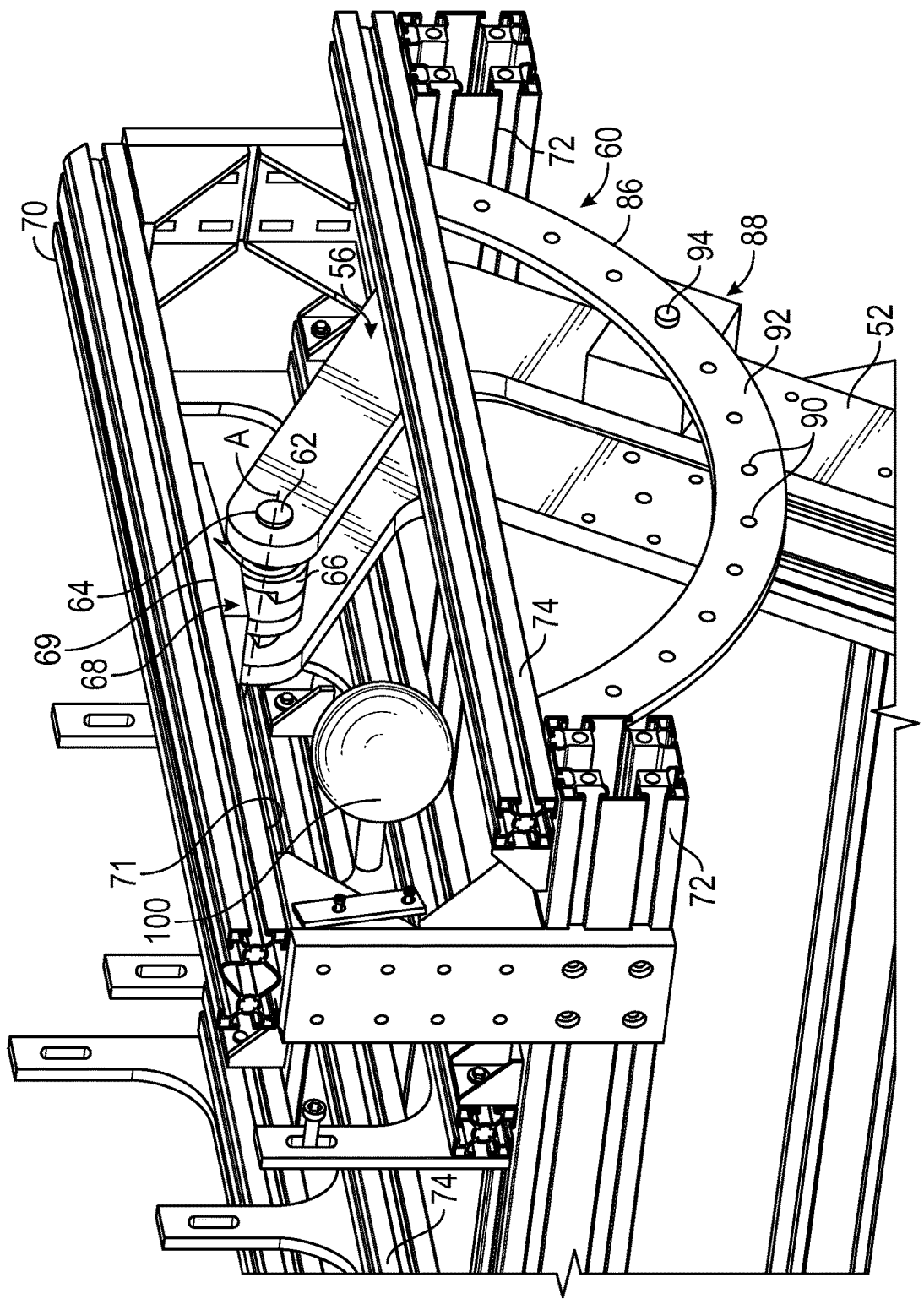
FIG. 4 is an enlarged view of a rotational assembly of the tooling assembly shown in FIG. 1.

Referring now to FIG. 4, the second end portion 56 of each leg 52 defines an aperture 62. The aperture 62 is shaped to receive a shaft 64. The shaft 64 defines an axis of rotation A and is rotatably connected to the base 20 of the tooling assembly 10. The tooling assembly 10 also includes a pillow block bearing 68. The pillow block bearing 68 includes an anti-friction bearing (not visible in FIG. 4) and a housing 66, where the anti-friction bearing is contained within the housing 66. The shaft 64 is received within the anti-friction bearing of the pillow block bearing 68, and rotates about its axis of rotation A within the anti-friction bearing of the pillow block bearing 68. As seen in FIG. 4, the pillow block bearing 68 is mounted upon a lower surface 71 of a support bar 70 of the base 20. The pillow block bearing 68 is also referred to as a housed bearing unit or a plummer block, and is any type of mountable bearing where a mounted shaft (i.e., the shaft 64) is positioned in a substantially parallel plane with respect to a mounting surface (i.e., the mounting surface 69) of the pillow block bearing 68.

Referring to both FIGS. 3 and 4, the base 20 includes two support bars 70. Each support bar 70 may be positioned at one of the sides 44 of the base 20. The base 20 may also include two elongated bars 72 oriented in a direction substantially parallel to one another and substantially perpendicular with respect to the support bars 70. As seen in FIG. 3, a plurality of bars 74 are mounted along the two bars 72. The bars 74 are oriented in a direction substantially perpendicular to the two bars 72, and are spaced at substantially equal distances from one another. Moreover, the bars 74 are arranged along an entire length L of the two bars 72. However, the embodiment as shown in FIGS. 3 and 4 is merely exemplary in nature, and the bars 74 may be arranged in a variety of configurations along the two bars 72. For example, in another embodiment, the bars 74 may each be spaced at different distances from one another, or may not extend along the entire length L of the two bars 72. The arrangement of the bars 74 depends upon the specific location of each of the frames 22. The plurality of bars 74 are configured to slide along the bars 72. Sliding the plurality of bars 74 adjusts the position of the bars 74, which in turn adjusts the position of the frames 22. Sliding the plurality of bars 74 along the two bars 72 obtains different arrangements and configurations of the bars 74. Accordingly, the frames 22 are configured to slide along the bars 72 to adjust the position of each frame 22 to define a predetermined contour corresponding to the part (i.e., the panel 24). Furthermore, the number of frames 22 depend on the specific requirements of the panel 24. For example, additional frames 24 are provided to increase strength. In contrast, for shorter panel 24 fewer frames 22 are used. Alternatively, instead of removing frames 22 the frames 22 are positioned closer with respect to one another.

Referring to FIGS. 2 and 3, a plurality of support members 28 are fixedly attached to the base 20. In the embodiment as illustrated, each support member 28 defines a body 80 and a plurality of projections 82 that extend upwardly and away from the body 80 of the support member 28. Each support member 28 is releasably coupled to a corresponding one of the frames 22 by a fastening system 78. The fastening system 78 includes a plurality of mechanical fasteners 59. In the exemplary embodiment as shown, the mechanical fasteners 59 are bolts. Specifically, each projection 82 of the support member 28 defines an aperture 76, where the aperture 76 is shaped to receive a corresponding portion of the fastener 59 (i.e., the shank of the bolt) of the fastening system 78. Each frame 22 also defines apertures 77 that correspond to the apertures 76 of the support member 28. The apertures 77 are also shaped to receive one of the fasteners 59. Although the figures illustrate the fastening system 78 including bolts, any other approach to releasably couple the bars 74 to the support members 28 may be used as well such as, for example, spring pins or dovetail fasteners.

Figure 5:
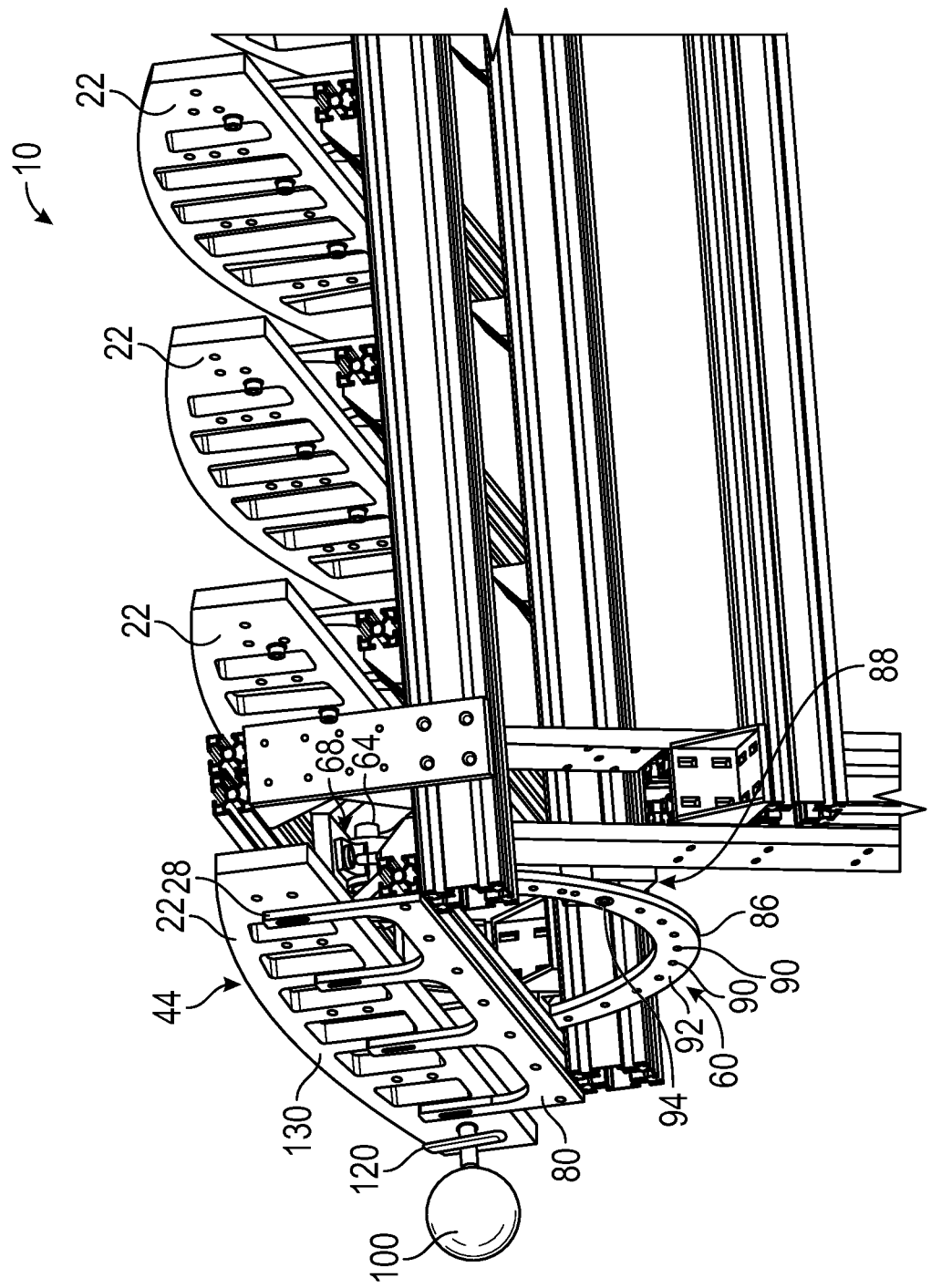
FIG. 5 is another view of the rotational assembly shown in FIG. 4.

FIG. 5 is another view of one of the rotational assemblies 60 of the tooling assembly 10. Referring to both FIGS. 4 and 5, the rotational assembly 60 includes the shaft 64, the pillow block bearing 68, a selector plate 86, and an indexing mechanism 88. In the exemplary embodiment as shown, the selector plate 86 includes a substantially semi-circular profile. The selector plate 86 defines a plurality of circumferentially spaced, uniformly shaped apertures 90. The apertures 90 may be disposed along a side surface 92 defined by the selector plate 86. The indexing mechanism 88 includes a rod or pin 94 attached to the leg 52 of the base 20. The pin 94 is shaped to correspond with the apertures 90 defined by the selector plate 86.

As seen in FIG. 4, the shaft 64 is rotatably connected to the base 20. Specifically, the shaft 64 is rotatably connected to the second end portion 56 of the leg 52 by the aperture 62. The shaft 64 rotates about the axis of rotation A to position the panel 24 into a specific angular position relative to the leg 52. The specific angular position of the panel 24 is measured with respect to the axis of rotation A of the shaft 64. In particular, referring to FIGS. 1 and 4-5, an operator may exert a force upon the base 20, at one of the two bars 72. As the force is exerted upon the base 20, the shaft 64 rotates within the pillow block bearing 68 about its axis of rotation A in either a clockwise or a counterclockwise direction. As the shaft 64 rotates about the axis of rotation A, the bars 74, the support members 28, the frames 22, and the panel 24 (FIG. 1) rotate together with the shaft 64. Once the operator has rotated the panel 24 into the specific angular position, the operator may then insert the pin 94 though one of the apertures 90 of the selector plate 86. The panel 24 is secured into the specific angular position once the pin 94 is received by one of the apertures of the selector plate 86. In the non-limiting embodiment as shown in the figures, the range of rotation of the panel 24 is about ninety degrees. However, in another embodiment, panel 24 may include a range of rotation of three hundred and sixty degrees. Although the embodiments describe the rotational assembly 60 as a mechanical device driven manually by an operator, in another embodiment the rotational assembly 60 is driven electronically instead. Specifically, the shaft 64 of the rotational assembly 60 is rotated about the axis of rotation A by a rotary actuator or servomotor (not illustrated in the figures).

Referring to FIGS. 3-5, in one embodiment the tooling assembly 10 includes a plurality of datum targets 100. In the embodiment as illustrated, the datum targets 100 are substantially spherical in shape. The datum targets 100 specify a point relative to the tooling assembly 10 to establish a datum. In the embodiment as shown, three datum targets 100 are provided in order to define a plane. The three datum targets 100 define a plane when the tooling assembly 10 is placed within a machine vision system (not illustrated in the figures). The machine vision system refers to the technology used for providing imaging-based automatic inspection and analysis for applications such as, but not limited to, automatic inspection, process control, or robot guidance.

Referring now to FIGS. 1 and 2, the vacuum cups 36 of the securing system 38 provide the suction force configured to releasably couple the panel 24 against the upper surface 34 of each of the frames 22. The vacuum cups 36 are fluidly connected to a vacuum producing device (not illustrated) such as, for example, a vacuum pump. In one embodiment, the vacuum producing device provides the suction force between an inner surface 102 of each vacuum cup 36 and the tool-side surface 32 of the panel 24. However, in another approach the suction created by pressing the vacuum cups 36 against the tool-side surface 32 of the panel is sufficient to retain the panel 24 to the tooling assembly 10. In other words, the suction force may be created without an external vacuum producing device in some instances. If the suction force is provided without the vacuum producing device, then check valves are provided so that there is no loss of suction. As seen in FIG. 2, the vacuum cups 36 are arranged in a plurality of rows R, where each row R of vacuum cups 36 is supported by one of the frames 22. The vacuum cups 36 of each row R are fluidly connected to one another, and to the vacuum producing device. For example, in one embodiment, a conduit such as tubing (not illustrated) is used to fluidly connect a row R of vacuum cups 36 together with the vacuum producing device. In another embodiment, a passageway within each frame 22 (not visible in FIG. 2) is used to fluidly connect the vacuum cups 36 together with the vacuum producing device.

Figure 8:
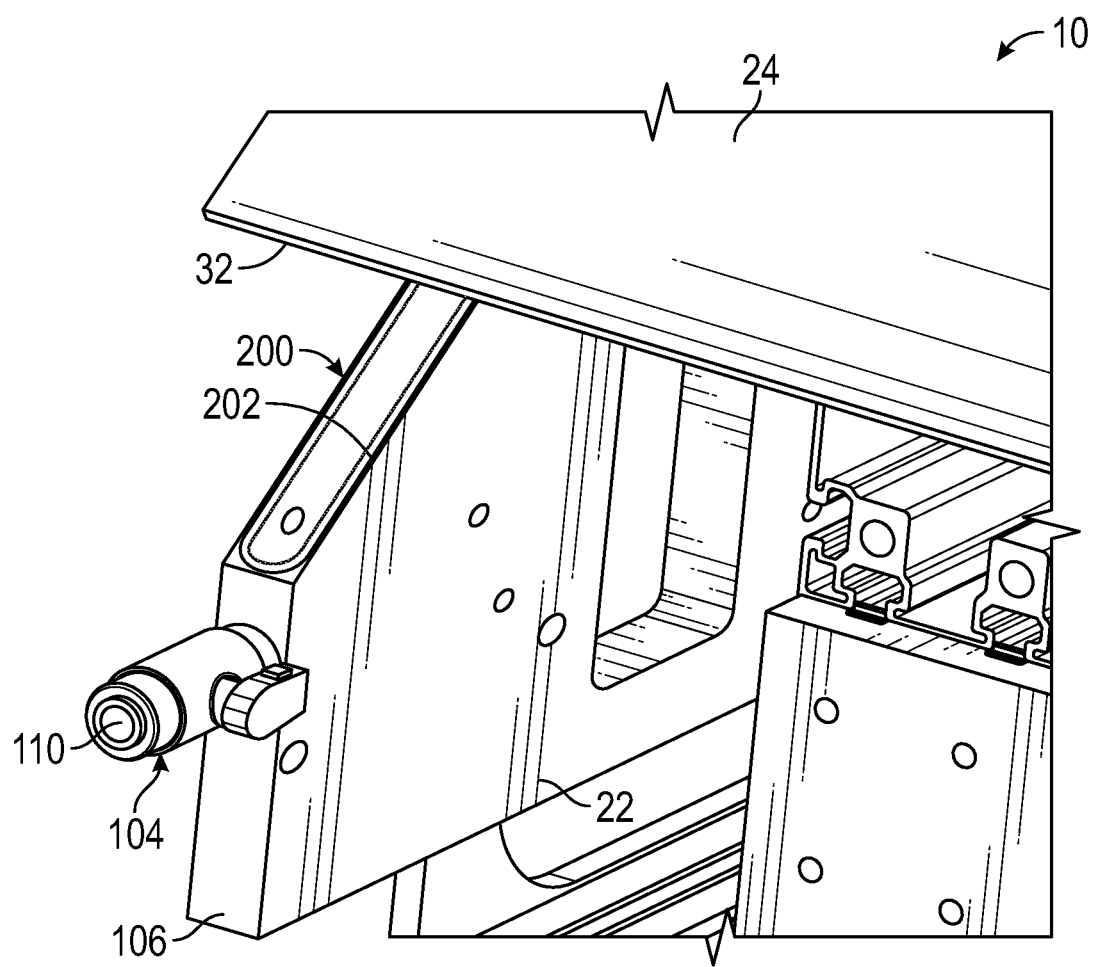
FIG. 8 illustrates a valve connected to one of the frames of the tooling assembly.

FIG. 8 illustrates a valve 104 connected at rear surface 106 of one of the frames 22. Although a single valve 104 is shown in FIG. 8, each frame 22 includes a corresponding valve 104. Referring to both FIGS. 2 and 8, the tooling assembly 10 comprises a plurality of valves 104, where each of the valves 104 is fluidly connected to a corresponding row R of the vacuum cups 36. Vacuum enters the valve 104 through an opening 110, passes through the valve 104, and into the conduit or passageway (not visible in FIG. 2) that fluidly connects a row R of vacuum cups 36 together. Each valve 104 may be adjusted accordingly to provide varying levels of suction force to releasably secure the panel 24 against the upper surface 34 of a corresponding frame 22. For example, in one approach, a first row R1 of vacuum cups 36 is provided with a first level of vacuum, and a second row R2 of vacuum cups 36 located adjacent to the first row R1 is provided with a second level of vacuum. In one embodiment, vacuum is supplied to the first row R1 of vacuum cups 36, but not to the second row R2 of vacuum cups 36.

Referring now to FIGS. 1 and 2, the suction force provided by the vacuum cups 36 is based, at least in part, on the thickness of the panel 24. Specifically, the suction force is sufficient to cause the panel 24 to be secured against the upper surface 34 of the frames 22. The tool-side surface 32 of the panel 24 abuts against the upper surface 34 of each frame 22. In one embodiment, the panel 24 may be flexible such that the panel 24 is actually elastically deformed into the contour defined by the upper surface 34 of the frames 22 by the suction force. However, in an alternative embodiment the panel 24 is relatively stiff, and the suction force is unable to elastically deform the panel 24.

In the exemplary embodiment as shown in FIG. 2, the upper surface 34 of the frames 22 each define a substantially arcuate or curved profile. However, the upper surface 34 of the frames 22 may include any number of profiles. Furthermore, FIG. 2 illustrates each frame 22 having substantially identical upper surfaces 34. Accordingly, the panel 24 also includes a substantially uniform cross-section when viewed along one of the sides 30 of the panel 24. However, in another embodiment, the panel 24 includes a variable cross-sectional profile. That is, the cross-section of the panel 24 is variable when viewed along one of the sides 30. If the panel 24 includes a variable cross-section, then the upper surfaces 34 of the frames 22 will vary in order to create the variable cross-sectional profile of the panel 24.

The suction force provided by the vacuum cups 36 retains the panel 24 in place against the frames 22, even as the shaft 64 and the panel 24 rotate about the axis of rotation A (FIG. 4). However, the suction force is not sufficient to elastically deform the panel 24 around areas where the vacuum cups 36 apply vacuum. For example, in the embodiment as shown in FIGS. 1-2, the suction force provided by the vacuum cups 36 is not sufficient to elastically deform the panel 24 such that the tooling surface 26 includes a series of circular indentations or dimples where the vacuum cups 36 contact the tooling-side surface 32 of the panel 24. In one exemplary embodiment, the thickness T of the panel 24 ranges from about 0.006 to about 0.022 of an inch (0.1524 to 0.5588 millimeters), and the amount of vacuum applied ranges from about 0 to about 30 inches of mercury (0 to 1.00263 atm).

Referring to FIGS. 1-3, in one embodiment the tooling assembly 10 includes a plurality of stops 120. The stops 120 are retaining devices that keep the panel 24 in place if there is a loss of vacuum such that the vacuum cups 36 are no longer able to maintain a suction force sufficient to secure the panel 24 against the frames 22. As seen in FIG. 1, two stops 120 may be positioned on a rear surface 122 of two different frames 22, where an edge 124 of the panel 24 abuts against the stops 120. Thus, in the event there is a loss or decreased amount of vacuum provided to the vacuum cups 36, the stops 120 prevent the panel 24 from sliding off the upper surface 34 of the frames 22 (FIG. 2). Referring to FIGS. 2 and 5, one or more stops 120 may also be positioned on the two frames 22 located on the opposing sides 44 of the tooling assembly 10. Specifically, the stops 120 may be positioned on an outermost side surface 130 of the two frames 22 located on the opposing sides 30.

In addition to retaining the panel 24 during a loss of vacuum, the stops 120 are also used as fixed datum points for Computer Numeric Control (CNC) programming if the tooling assembly 10 is placed within an automated machine tool. For example, the stops 120 and the datum targets 100 are used to orient the tooling assembly 10 and panel 24 with respect to a machine and/or facility coordinate system. Referring now to FIG. 4, in some instances the shaft 64 of the rotational assembly 60 is attached to a servomotor (not illustrated) and is rotated electronically about its axis. The servomotor is synchronized with an automated machine tool. In one approach, an external machine may be CNC synchronized with the rotation of the panel 24 about its axis of rotation A. With this arrangement, operations such as painting, drilling, and machining may be performed upon the panel 24 supported by the tooling assembly 10.

Figure 6:
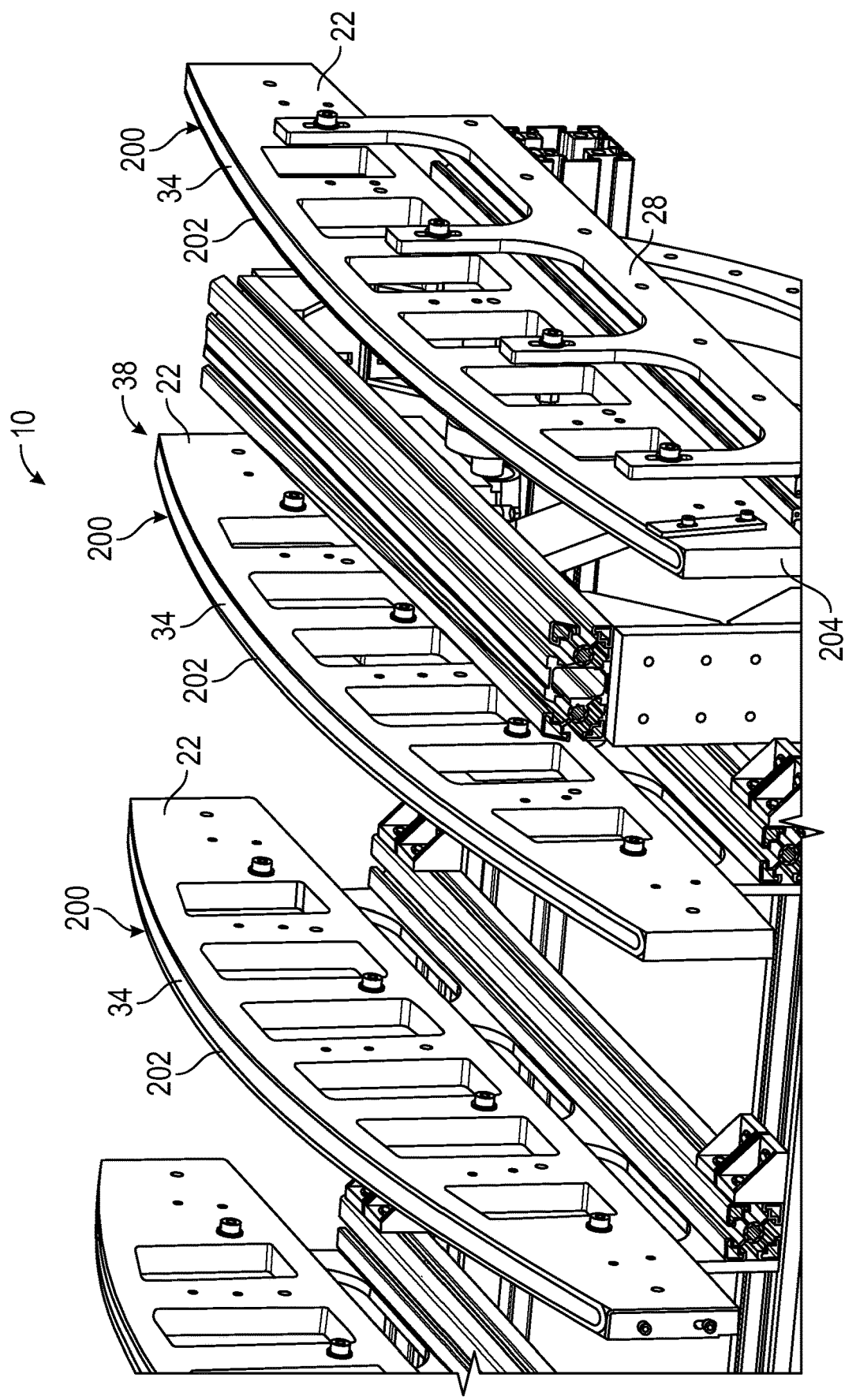
FIG. 6 is an illustration of an alternative embodiment of the disclosed tooling assembly including a manifold system for securing the panel to the frames.
Figure 7:
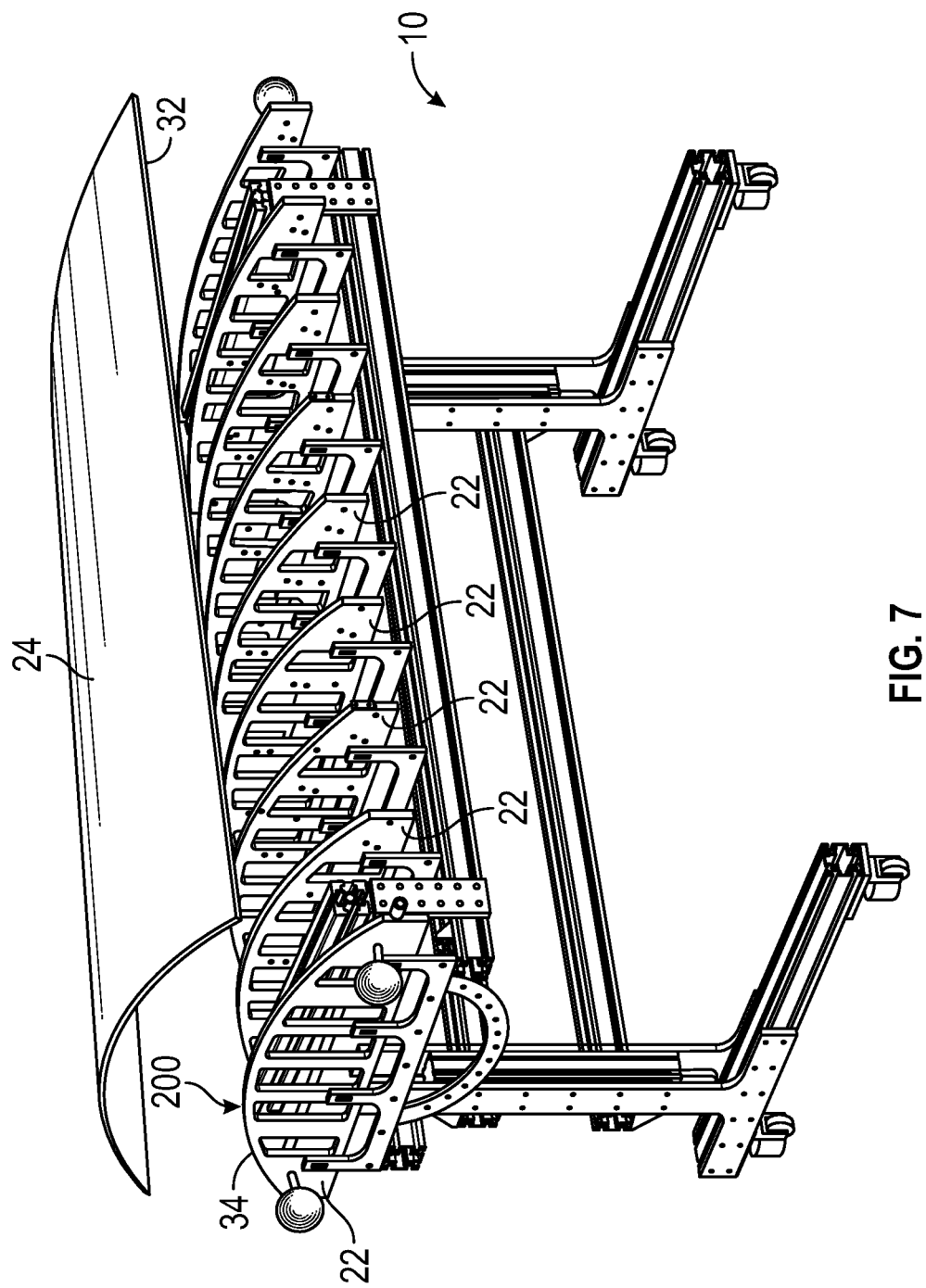
FIG. 7 is a perspective view of the tooling assembly shown in FIG. 6.

FIG. 6 is an alternative embodiment of the disclosed tooling assembly 10, where the securing system 38 includes the manifolds 200. As seen in FIG. 6, the manifolds 200 are each disposed along the upper surface 34 of one of the frames 22. Although FIG. 6 illustrates a manifold 200 disposed along the upper surface 34 of each frame 22, the embodiment is intended to be exemplary in nature, and the manifolds 200 may also be disposed along the upper surface 34 of only a portion of the frames 22. The manifolds 200 each include a corresponding gasket 202 received within a groove (not visible in FIG. 6) located around an outer periphery 204 of the upper surface 34 of each frame 22. Thus, the gasket 202 extends around the outer periphery 204 of the upper surface 34 of one of the frames 22 to define one of the manifolds 200. The gasket 202 is a shaped piece of elastomer for sealing the upper surface 34 of the frames 22 to the tool-side surface 32 of the panel 24 (FIG. 7).

Figure 9:
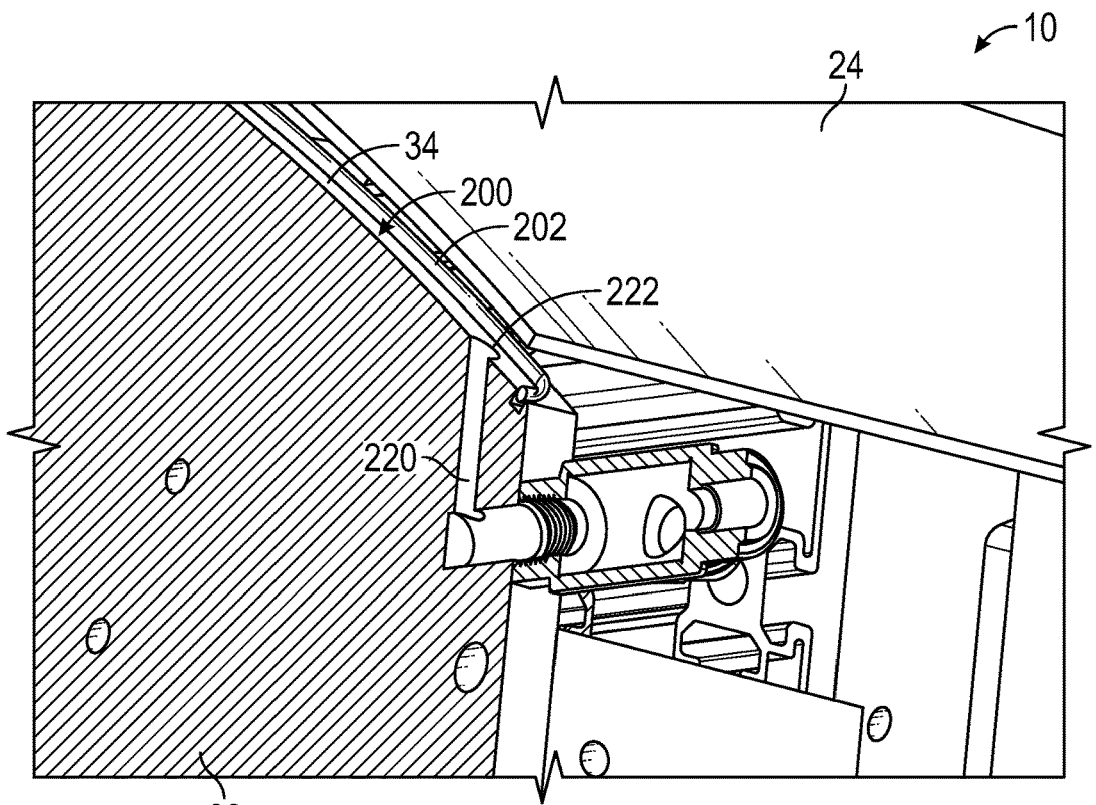
FIG. 9 is a cross-sectioned view of the frame shown in FIG. 8.

FIG. 8 is an illustration of the valve 104 connected to the rear surface 106 of one of the frames 22, and FIG. 9 is a cross-sectioned view of the frame 22 shown in FIG. 8. Referring now to FIGS. 6-8, vacuum enters the valve 104 through the opening 110, passes through the valve 104, and into a passageway 220 within the frame 22 (FIG. 9). The passageway 220 terminates at an opening 222 located along the upper surface 34 of the frame 22 (seen in FIG. 9). The passageway 220 fluidly connects one of the valves 104 to a corresponding one of the manifolds 200. Similar to the embodiment as shown in FIGS. 1-5, each valve 104 is adjusted accordingly in order to provide varying levels of suction force within each manifold 200. However, unlike the embodiment as described above including vacuum cups, an external vacuum producing device is needed in order to provide the suction force to releasably couple the panel 24.

Once the vacuum producing device (not illustrated) is activated to produce vacuum, the tool-side surface 32 of the panel 24 (FIG. 7) contacts the upper surface 34 of the frame 22. In other words, the vacuum within the manifold 200 is sufficient to cause the tool-side surface 32 of the panel 24 to be flush with the upper surface 34 of the frame 22. Accordingly, the manifolds 200 provide the suction force configured to releasably couple the panel 24 against the upper surface 34 of each of the frames 22.

Figure 10:
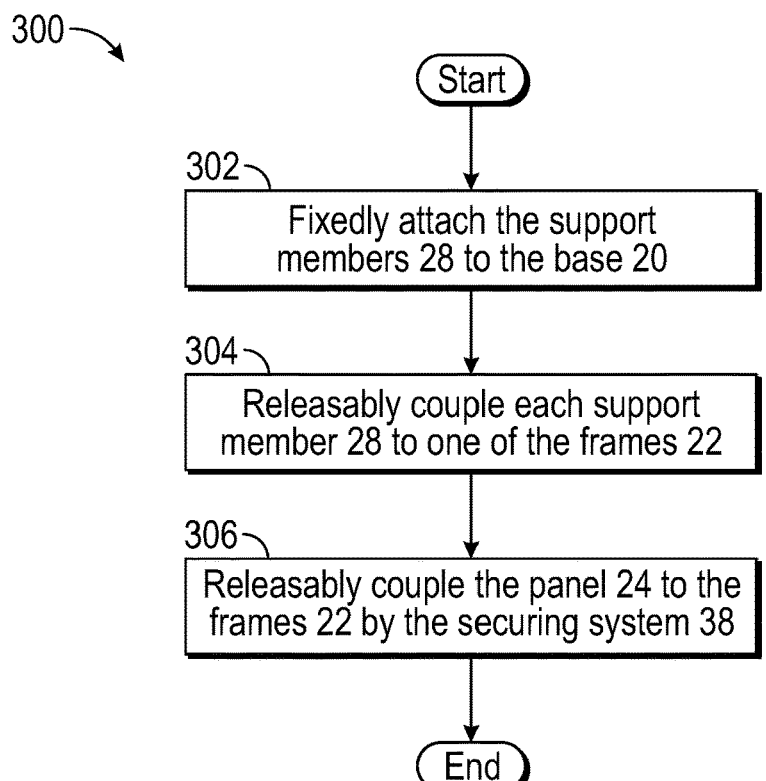
FIG. 10 is an exemplary process flow diagram illustrating a method for supporting the panel using the disclosed tooling assembly.

FIG. 10 illustrates an exemplary process flow diagram illustrating a method 300 for supporting the panel 24 by the tooling assembly 10. Referring now to FIGS. 1-3 and 10, method 300 begins at block 302. In block 302, the method 300 includes fixedly attaching a plurality of support members 28 to the base 20. Method 300 then proceeds to block 304.

In block 304, the method 300 includes releasably coupling each support member 28 to a corresponding one of the frames 22 by the fastening system 78. As seen in FIG. 2, the plurality of frames 22 each define a corresponding upper surface 34. Method 300 then proceeds to block 306.

In block 306, the method 300 includes releasably coupling the panel 24 to the plurality of frames 22 by providing the suction force by the securing system 38. Specifically, the suction force is configured to releasably secure the panel 24 against the upper surface 34 of the plurality of frames 22. The securing system 38 includes either a plurality of vacuum cups 36 or a plurality of manifolds 200 that are each disposed along the upper surface 34 of one of the frames 22. Specifically, in the embodiments as shown in FIGS. 1-5, the securing system 38 includes the vacuum cups 36. Alternatively, in the embodiment as shown in FIGS. 6-9, the securing system 38 includes the manifolds 200. Method 300 then terminates.

Referring generally to the figures, technical effects and benefits of the disclosed tooling assembly include modularity, increased flexibility, and substantial cost savings when compared to conventional tooling. Conventional tooling typically includes a panel fixedly attached to a frame. In contrast, the disclosed tooling assembly includes a securing system for providing a suction force to releasably couple the panel against the upper surface of the frames, thereby allowing for the panel to be removed and replaced with another type of panel. Accordingly, the tooling surface of the panel is interchangeable. Moreover, the frames are also releasably secured to the frame as well. Thus, the frame of the tooling assembly remains the same, and only the frame and the panel need to be replaced in order to fabricate another component. The disclosed tooling assembly may significantly reduce cost when compared to conventional tooling techniques, since only the frames that require repair or replacement can be removed from the tooling assembly. The disclosed tooling assembly may also require less storage space when compared to current tooling, since the frames may be removed and stored on a pallet rack, and another set of frames may be installed to the base of the tooling assembly. Finally, the tooling assembly may be used in a variety of different applications such as, for example, machining, development, drill/fit, assembly, layup, sealing, and automated indexer/axis.

While the forms of apparatus and methods herein described constitute preferred aspects of this disclosure, it is to be understood that the disclosure is not limited to these precise forms of apparatus and methods, and the changes may be made therein without departing from the scope of the disclosure.

What is claimed is:

1. A tooling assembly for use with a panel defining opposing sides, a length, and a tool-side surface and the tool-side surface defining a profile, the tooling assembly comprising:
   a base including a pair of bars and a plurality of bars that are mounted along the pair of bars, wherein the plurality of bars is oriented perpendicular to the pair of bars;
   a plurality of support members attached to the base, wherein each support member of the plurality of support members is coupled to one of the bars of the plurality of bars;
   a rotational assembly including a shaft, wherein the shaft defines an axis of rotation and is rotatably connected to the base, and wherein the shaft rotates about the axis of rotation to position the panel into a specific angular position;
   a plurality of frames each defining a corresponding upper surface, wherein each of the support members is releasably coupled to a corresponding one of the frames by a fastening system, wherein the plurality of frames each include identical upper surfaces and are configured to releasably couple to the panel, and wherein the upper surfaces of the frames are each shaped to correspond with a portion of the profile of the tool-side surface of the panel, and wherein a number of frames that are part of the tooling assembly depend upon a length of the panel, and wherein the profile of the panel is one of arcuate or curved when viewed along one of the opposing sides of the panel;
   a securing system configured to provide a suction force that releasably secures the panel against the upper surface of the frames, wherein the plurality of frames correspond to the profile-of the tool-side surface of the panel; and
   wherein the rotational assembly further comprises:
      a selector plate including a plurality of apertures spaced apart along the selector plate; and
      an indexing mechanism including a pin shaped to correspond to the plurality of apertures of the selector plate, wherein the pin is insertable into one of the plurality of apertures of the selector plate to secure the panel into the specific angular position.

2. The tooling assembly of claim 1, wherein the securing system comprises a plurality of vacuum cups arranged into a plurality of rows.

3. The tooling assembly of claim 2, wherein the vacuum cups of a single row are fluidly connected to one another.

4. The tooling assembly of claim 2, comprising a plurality of valves, wherein each of the valves is fluidly connected to a corresponding row of the vacuum cups.

5. The tooling assembly of claim 2, wherein a first row of the vacuum cups is provided with a first level of vacuum, and a second row located adjacent to the first row is provided with a second level of vacuum.

6. The tooling assembly of claim 1, wherein the fastening system includes a plurality of mechanical fasteners.

7. The tooling assembly of claim 1, wherein each of the support members defines a body and a plurality of projections that extend upwardly and away from the body.

8. The tooling assembly of claim 7, wherein each of the projections of the support members defines an aperture, wherein the aperture is shaped to receive a corresponding fastener of the fastening system.

9. The tooling assembly of claim 1, wherein the securing system includes a plurality of manifolds each disposed along the upper surface of one of the frames.

10. The tooling assembly of claim 9, wherein the manifolds each include a corresponding gasket, and wherein the gasket extends around an outer periphery of the upper surface of one of the frames to define one of the manifolds.

11. The tooling assembly of claim 1, further comprising a leg having a first end portion and a second end portion, wherein the rotational assembly is attached to the second end portion of the leg.

12. The tooling assembly of claim 11, wherein the second end portion of the leg defines an aperture that is shaped to receive the shaft of the rotational assembly.

13. A tooling assembly for use with a panel defining opposing sides, a length, and a tool-side surface and the tool-side surface defining a profile, the tooling assembly comprising:
   a base including a pair of bars and a plurality of bars that are mounted along the pair of bars, wherein the plurality of bars is oriented perpendicular to the pair of bars;
   a plurality of support members attached to the base, wherein each support member of the plurality of support members is coupled to one of the bars of the plurality of bars;
   a plurality of frames each defining a corresponding upper surface, wherein each of the support members is releasably coupled to a corresponding one of the frames by a fastening system, the plurality of frames each include identical upper surfaces and are configured to releasably couple to the panel, wherein a number of frames that are part of the tooling assembly depend upon a length of the panel, and wherein the profile of the panel is one of arcuate or curved when viewed along one of the opposing sides of the panel, and wherein the upper surfaces of the frames are each shaped to correspond with a portion of the profile of the tool-side surface of the panel;
   a leg defining a first end portion and a second end portion;
   a securing system configured to provide a suction force that releasably secures the panel against the upper surface of the frames, wherein the plurality of frames correspond to the profile of the tool-side surface of the panel; and
   a rotational assembly connected to the second end portion of the leg, wherein the rotational assembly includes a shaft defining an axis of rotation and rotatably connected to the base, wherein the shaft rotates about the axis of rotation positioning the panel into a specific angular position;

wherein the rotational assembly further comprises:
- a selector plate including a plurality of apertures spaced apart along the selector plate; and
- an indexing mechanism including a pin shaped to correspond to the plurality of apertures of the selector plate, wherein the pin is insertable into one of the plurality of apertures of the selector plate to secure the panel into the specific angular position.

14. The tooling assembly of claim 13, wherein the securing system comprises a plurality of vacuum cups arranged in a plurality of rows.

15. The tooling assembly of claim 14, wherein the vacuum cups of each row are fluidly connected to one another.

16. The tooling assembly of claim 13, wherein the securing system includes a plurality of manifolds each disposed along the upper surface of one of the frames.

17. The tooling assembly of claim 16, wherein the manifolds each include a corresponding gasket, and wherein the gasket extends around an outer periphery of the upper surface of one of the frames to define one of the manifolds.

18. The tooling assembly of claim 13, wherein the second end portion of the leg defines an aperture that is shaped to receive the shaft of the rotational assembly.

19. A method for supporting a panel by a tooling assembly, the method comprising:
- attaching a plurality of support members to a base, wherein the base includes a pair of bars and a plurality of bars that are mounted along the pair of bars, wherein the plurality of bars is oriented perpendicular to the pair of bars, wherein each support member of the plurality of support members is coupled to one of the bars of the plurality of bars;
- releasably coupling each of the support members to a corresponding one of a plurality of frames by a fastening system, wherein the frames each define a corresponding upper surface, wherein the plurality of frames each include identical upper surfaces, wherein a number of frames that are part of the tooling assembly depend upon a length of the panel, and wherein the profile of the panel is arcuate or curved when viewed along one of the opposing sides of the panel;
- releasably coupling the panel to the upper surface of the frames by providing a suction force, wherein the suction force is provided by a securing system;
- sliding the plurality of frames to adjust a position of each frame to correspond to a profile of a tool-side surface of the panel; and
- rotating a shaft about an axis of rotation to position the panel into a specific angular position, wherein the shaft is part of a rotational assembly connected to the base, and wherein the rotational assembly further comprises a selector plate including a plurality of apertures spaced apart along the selector plate; and an indexing mechanism including a pin shaped to correspond to the plurality of apertures of the selector plate, wherein the pin is insertable into one of the plurality of apertures of the selector plate to secure the panel into the specific angular position.

20. The method of claim 19, wherein the securing system includes either a plurality of vacuum cups or a plurality of manifolds each disposed along the upper surface of one of the frames.

* * * * *

UNITED STATES PATENT AND TRADEMARK OFFICE
CERTIFICATE OF CORRECTION

PATENT NO. : 10,906,157 B2  
APPLICATION NO. : 15/437188  
DATED : February 2, 2021  
INVENTOR(S) : Jeffrey H. Olberg, Daniel J. Perron and Shane E. Arthur Page 1 of 1

It is certified that error appears in the above-identified patent and that said Letters Patent is hereby corrected as shown below:

In the Claims

At Column 9, Lines 53-54, Claim 1 reads:  
"correspond to the profile-of the tool-side surface of the panel; and"  
Should read:  
--correspond to the profile of the tool-side surface of the panel; and--

Signed and Sealed this  
Tenth Day of August, 2021

Drew Hirshfeld  
*Performing the Functions and Duties of the*  
*Under Secretary of Commerce for Intellectual Property and*  
*Director of the United States Patent and Trademark Office*